United States Patent
Jones et al.

(10) Patent No.: US 6,301,642 B1
(45) Date of Patent: Oct. 9, 2001

(54) SHARED MEMORY BUS ARBITRATION SYSTEM TO IMPROVE ACCESS SPEED WHEN ACCESSING THE SAME ADDRESS SET

(75) Inventors: Andrew Michael Jones, Redland; Peter Malcolm Barnes, Bradley Stoke, both of (GB)

(73) Assignee: STMicroelectronics Ltd., Almondsbury (GB)

( * ) Notice: Subject to any disclaimer, the term of this patent is extended or adjusted under 35 U.S.C. 154(b) by 0 days.

(21) Appl. No.: 09/149,272

(22) Filed: Sep. 8, 1998

(30) Foreign Application Priority Data

Sep. 8, 1997 (GB) .................................................. 9719047

(51) Int. Cl.$^7$ ...................................................... G06F 13/18
(52) U.S. Cl. ........................... 711/151; 711/150; 711/152; 711/158; 711/163; 710/107; 710/108; 710/109; 710/110; 710/111; 710/112; 710/113
(58) Field of Search ................................... 711/100, 104, 711/105, 137, 147, 148, 150, 151, 152, 158, 157, 167, 168; 380/255, 270; 710/107–113

(56) References Cited

U.S. PATENT DOCUMENTS

| | | | |
|---|---|---|---|
| 4,623,986 | * 11/1986 | Chauvel | 711/151 |
| 5,193,194 | 3/1993 | Gruender, Jr. et al. | 395/725 |
| 5,655,102 | 8/1997 | Galles | 395/477 |
| 5,983,325 | * 11/1999 | Lewchuk | 711/137 |
| 5,987,574 | * 11/1999 | Paluch | 711/158 |
| 6,049,855 | * 4/2000 | Jeddeloh | 711/157 |
| 6,052,134 | * 4/2000 | Foster | 345/521 |
| 6,052,756 | * 4/2000 | Barnaby et al. | 711/105 |

FOREIGN PATENT DOCUMENTS

WO 96/30838 10/1996 (WO) .

OTHER PUBLICATIONS

Fast Data Access of DRAMs by Utilizing a Queued Memory Command Buffer, *IBM Technical Disclosure Bulletin*, vol. 35(7): pp. 63–64, 1992.

* cited by examiner

*Primary Examiner*—Than Nguyen
(74) *Attorney, Agent, or Firm*—Theodore E. Galanthay; E. Russell Tarleton; Seed IP Law Group PLLC (57) ABSTRACT

A bus arbitration system is described which includes an arbitrator for controlling accesses to a memory bus by a plurality of memory users in response to requests made by those memory users. Each memory user reads the address if a current access to memory and generates a same-address-set signal when the address of the last access by that memory user lies in the same set as the address of the current access. The arbitrator holds for each memory user a predetermined number of accesses which are permitted by that memory user during an access span, and, responsive to a request, grants up to that predetermined number of accesses provided that the same-address-set signal is asserted.

22 Claims, 7 Drawing Sheets

SHARED MEMORY BUS ARBITRATION SYSTEM TO IMPROVE ACCESS SPEED WHEN ACCESSING THE SAME ADDRESS SET

TECHNICAL FIELD

The present invention relates to a bus arbitration system and method of controlling memory accesses from multiple memory users.

BACKGROUND OF THE INVENTION

Figure 1:
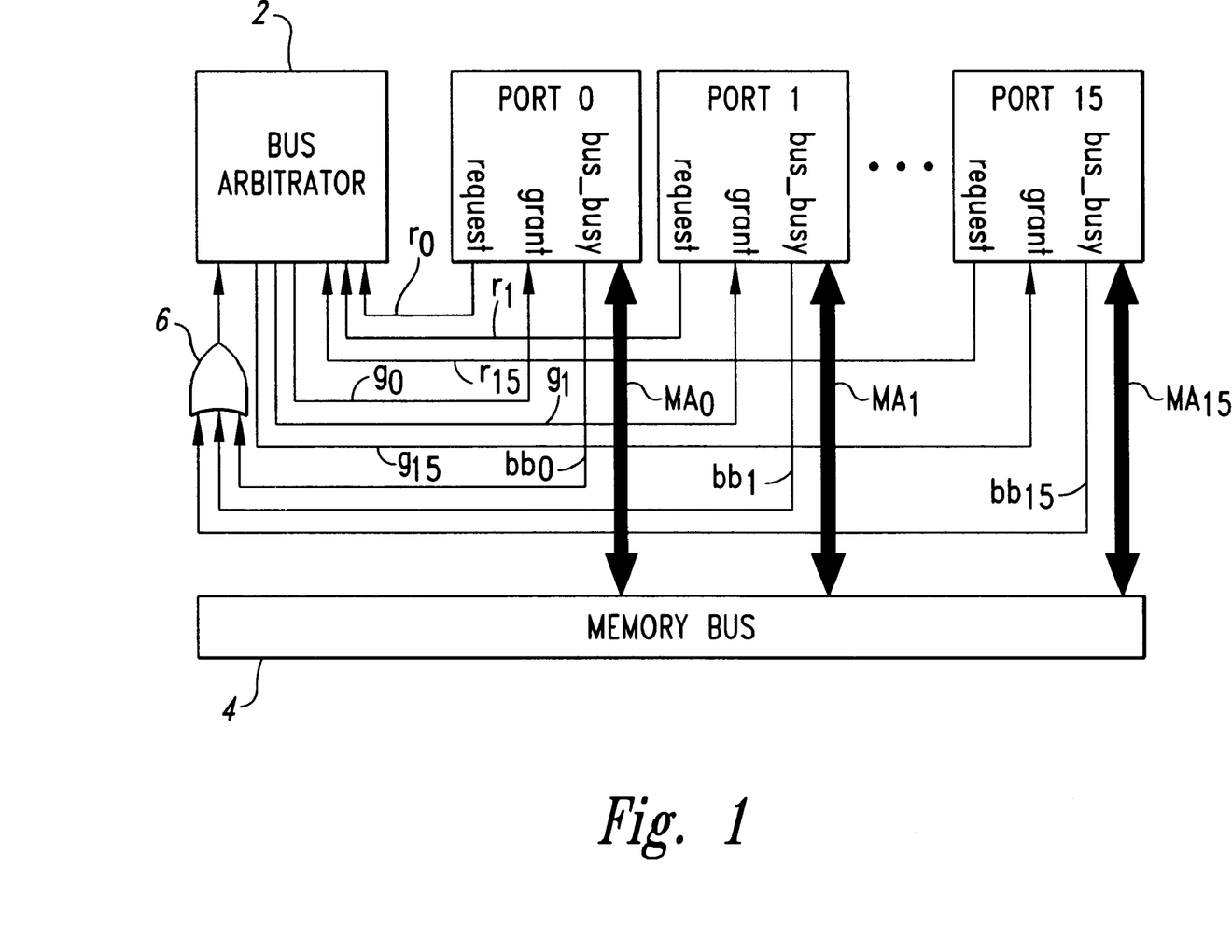
FIG. 1 is a schematic diagram of a generalized memory bus arbitration scheme.

The purpose of a memory bus arbiter is to decide which of several memory users (referred to herein as ports) is to be allowed access to a bus and hence to memory connected to the bus. A generalized scenario is illustrated by FIG. 1. In FIG. 1, reference numeral 2 denotes a bus arbiter (labeled "bus arbitrator") for controlling accesses by a plurality of ports $PORT_0 \ldots PORT_{15}$ to a memory bus 4. The memory bus 4 is connected to memory resource via an external memory interface not shown in FIG. 1. Alternatively, it could be connected directly to on-chip memory. Each port has a memory access path $MA_0 \ldots MA_{15}$ connecting it to the memory bus by which memory addresses can be sent to the memory resource and items returned from the memory resource. Each port has a request line $r_0 \ldots r_{15}$ connected to the bus arbiter and a grant line from the bus arbiter to each port $g_0 \ldots g_{15}$. Each port also has a bus_busy line $bb_0 \ldots bb_{15}$ connected through an OR gate 6 to the bus arbiter 2. Each port signals its request by asserting the request line $r_r \ldots r_{15}$. Some time later the arbiter asserts one of the grant lines indicating which port can use the bus. This process is known as "awarding tenure" of the bus. On receipt of a grant signal a port asserts its bus_busy signal then uses the memory bus to satisfy one or more of its memory requests via its memory access path MA. When the port is finished it de-asserts the bus_busy signal allowing the arbiter to award tenure again.

A wide variety of arbitration schemes have been used in existing bus schemes. When a port has its request signal asserted it is referred to herein as a requester. The three most common are:

1) static priority—the arbiter defines a static rank ordering of each of the ports. It awards tenure to the requester with the highest rank.

2) dynamic priority—similar to the static priority scheme insofar as the arbiter awards tenure to the requester with the highest rank, except that here following each granting the ranking is revised. The grantee is assigned lowest priority and the priority of all other ports which were below the grantee are increased by one.

3) round robin—the arbiter defines a static ordering of the ports and maintains an indication of the last requester which was awarded tenure. In determining tenure, the arbiter starts at the port which follows the last port to have tenure, then awards tenure to the next requester it finds in its traversal order of the ports. The arbiter traversal order for round robin is to start at the lowest numbered port and visit successively numbered ports in turn until the last port is reached and then to wrap around and start traversing from the lowest number port again.

Some schemes are combinations of the above. It is often the case, in real-time applications, that access to memory needs to be shared in a manner such that there is a limit on the amount of time that a requester can be passed over for tenure regardless of the request behavior of other ports. This constraint severely limits the usefulness of many obvious arbitration schemes.

SUMMARY OF THE INVENTION

According to one aspect of the present invention, there is provided a bus arbitration system that comprises:

a memory bus having an interface for accessing memory wherein items are held at locations in memory organized in address sets such that when one location in an address set has been accessed, remaining locations in the same address set can be accessed more quickly by a subsequent memory access than other locations in the memory;

a plurality of memory users each having access to said memory bus and each operable to generate a request for access to the memory;

an arbiter for controlling access to said memory bus by said memory users in response to said requests, wherein each memory user is operable to read the address of a current access to memory and to generate a same-address-set signal when the address of the last access by that memory user lies in the same set as the address of the current access, and wherein the arbiter holds for each memory user a predetermined number of accesses which are permitted by that memory user during an access span and, responsive to a request, grants up to that predetermined number of accesses provided that the same-address-set signal is asserted.

In the described embodiment, an access span is a sequence of requests from a single port to which the arbiter grants tenure consecutively.

In one embodiment said locations are addressable by memory addresses comprising a number of addressing bits such that locations within an address set are addressable by a reduced number of addressing bits.

The invention can be used to advantage in any situation where clustering accesses on the basis of locality may ultimately lead to relative addressing (possibly as a side effect using fewer addressing bits). This may be the case in magnetic and optical disks, magnetic tape etc. because the clustering implies less disk head/tape transport movement per access.

The invention is particularly useful in the context of DRAMs having a so-called fast page accessing mode. In this mode, all the cells (locations) on a page are energized when the first word on a page is accessed, therefore expediting subsequent accesses.

DRAMs are normally addressed by applying a row address and a column address to identify a particular location in memory. Memory addresses that have the same row address are said to be on the same page. If successive accesses are on the same page, the row address does not have to be reapplied so the second and subsequent accesses cost less time. Thus, in the described embodiment each address set constitutes a page in memory and the reduced number of addressing bits address the line in each page.

In the described embodiment, the arbiter has sequence determining circuitry for determining the sequence in which memory users are examined by the arbiter to see whether or not they are generating a request. This sequence can be programmable to take into account the number and type of memory users having access to the memory bus. This allows any particular architecture to be optimized in terms of its memory access bandwidth and latency requirements.

Another embodiment of the arbiter includes timing circuitry for determining a maximum time allowed between consecutive requests in an access span. If this time is exceeded that span will be terminated and a next request from a different memory user will be considered.

In addition to being able to program the sequence, the predetermined number of accesses within each access span for each memory user may also be programmable to take into account the pattern of memory accesses effected by each memory user.

The invention also provides a method of controlling accesses by multiple memory users to a common memory wherein items are held at locations in memory organized in address sets such that when one location in an address set has been accessed, remaining locations in the same address set can be accessed more quickly by a subsequent memory access than other locations in the memory. Each memory user reads the address of a current access to memory and generates with a request for access to the memory a same-address-set signal when the address of the last access by that memory user lies in the same set as the address of the current access. A predetermined number of memory accesses are granted to that memory user during an access span provided that the same-address-set signal is asserted.

For a better understanding of the present invention and to show how the same may be carried into effect reference will now be made by way of example to the accompanying drawings.

DETAILED DESCRIPTION OF THE INVENTION

Modem high-performance DRAM chips (dynamic read only memory chips) have a feature called fast page mode, which means that the most efficient way of using these types of memory occurs is when there is a high degree of locality in the addresses being accessed. Generally, if a subsequent memory request address differs from the previous request address only in the lower P bits then the memory request can be processed much more quickly. Such requests are called on-page accesses. The value of P (which is $\log_2$ (dram page size)) depends on the particular DRAM chips used and the configuration in which it is used.

The described embodiment of this invention exploits fast page mode by providing a bus arbiter (referred to herein as an arbitrator) which awards tenure in a manner which maximizes the likelihood of getting on-page accesses and hence optimizes memory performance. The approach used is illustrated by FIG. 2.

Figure 2:
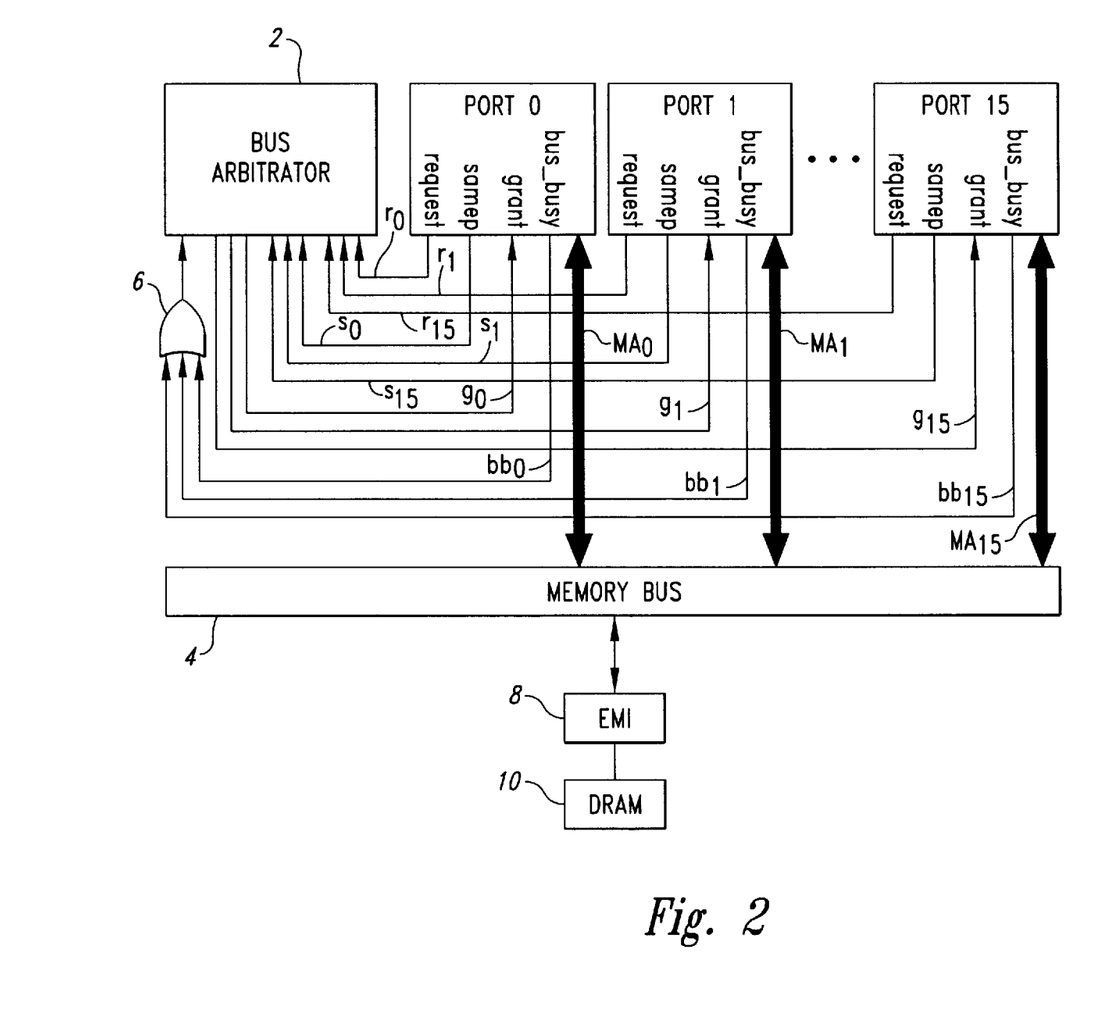
FIG. 2 is a schematic diagram of one embodiment of the present invention.

In FIG. 2, like numerals denote like parts as in FIG. 1. Thus, the bus arbitration scheme includes a bus arbitrator 2 for controlling accesses from a plurality of ports $PORT_0 \ldots PORT_{15}$ to a memory bus 4. The memory bus 4 is itself connected to an external memory interface 8, which is connected to a memory resource such as a DRAM 10. Memory access paths, MA, request lines $r_0 \ldots r_{15}$, grant lines $g_0 \ldots g_{15}$ and bus busy lines $bb_0 \ldots bb_{15}$ are provided as described above with reference to FIG. 1.

Along with its request signal $r_0 \ldots r_{15}$ each port generates a signal $S_0 \ldots S_{15}$ called samep. When asserted, the samep signal indicates that any difference between the address of the current request and this port's previous request is confined to the P lower order address bits. The arbitrator uses this knowledge of the locality of accesses from each port to determine whether it should service a multiplicity of requests from that port or whether it should move on to service another port's request.

Figure 8:
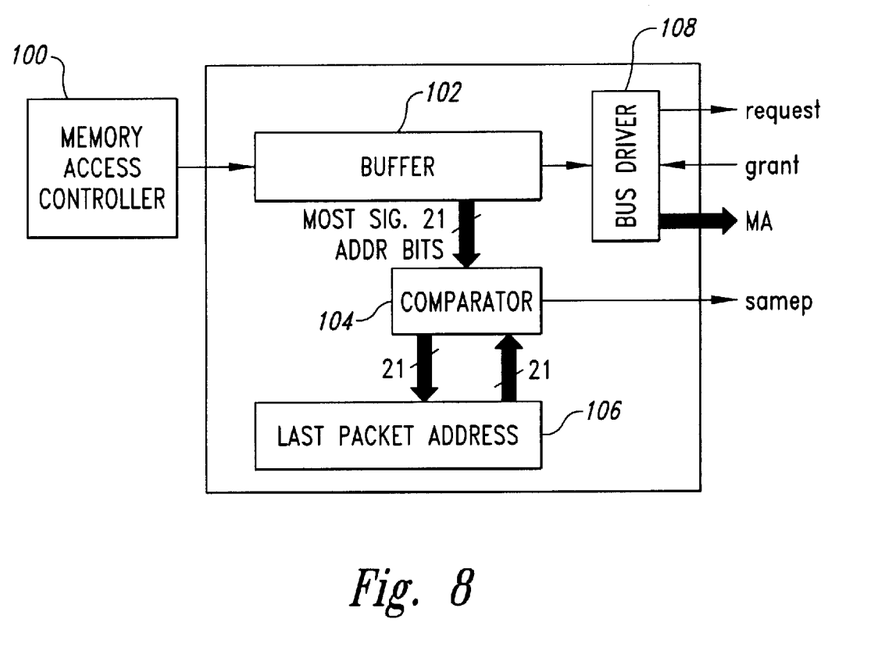
FIG. 8 is a block diagram of circuitry for generating a same-address-set signal.

FIG. 8 is a schematic block diagram of circuitry located within each port for generating the samep signal. A memory access controller 100 within each port generates a memory access request including a memory address and, if appropriate, associated data. The memory address and any data is stored in a buffer 102. The most significant 21 address bits are supplied to a comparator 104. The comparator also receives the most significant 21 address bits from a preceding address which has been stored in a last packet address store 106. The comparator 104 determines that any difference between the address of the current request and the previous request made by the port is confined to the P lower order address bits. If so, the samep signal is asserted by the comparator. Then, the 21 most significant address bits of the current request replace the 21 most significant address bits of the preceding request in the last packet address store 106 ready for comparison with a next request. The port circuitry also includes a bus driver 108 which generates the request and memory access signals and receives the grant signal.

Reverting now to FIG. 2, the arbitrator allocates a maximum number of times that it will consecutively award tenure (each allowing one memory access) to each port. It will continue to award tenure to a port which has its request line asserted and its samep signal asserted so long as this maximum number is not exceeded. It will otherwise award tenure in a modified round-robin manner.

Figure 3:
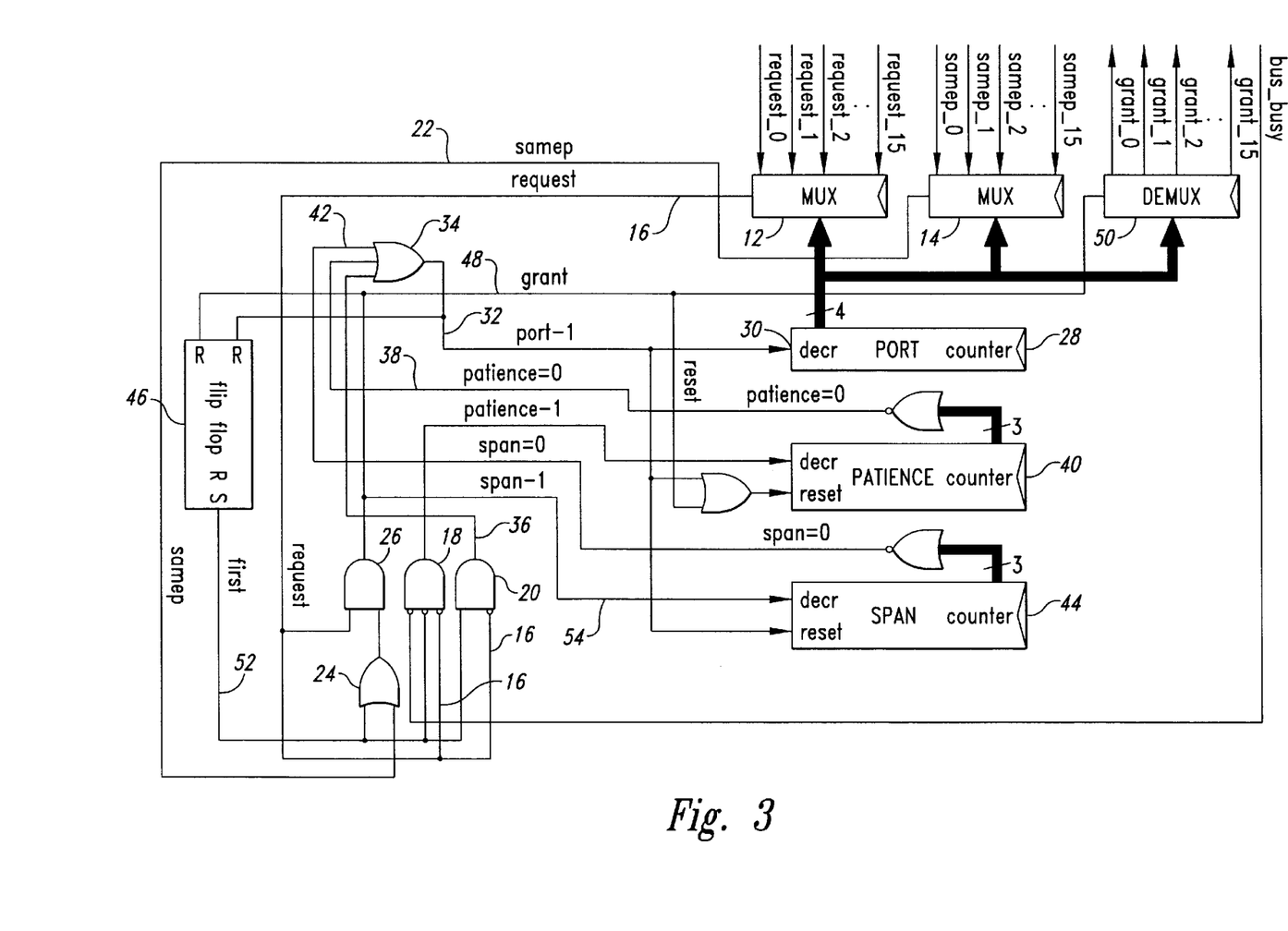
FIG. 3 is a schematic diagram of an implementation of an arbitrator.

FIG. 3 illustrates arbitration circuitry of a simplified embodiment of the invention. Appendix A describes the symbols used in FIGS. 3 and 4.

In FIG. 3 details of the clocking scheme have been omitted for clarity.

Each of the request signals $r_0 \ldots r_{15}$ are supplied to a first multiplexor 12. The samep signals $S_0 \ldots S_{15}$ are supplied to a second multiplexor 14. If a request signal is asserted while a particular port is being examined, the multiplexor 12 outputs a signal on request line 16 which is supplied to a first AND gate 26 and to the inverted input of a second AND gate 18 and a third AND gate 20. If a samep signal is asserted while the port is under examination, the second multiplexor 14 supplies a signal along samep line 22 to an input of an OR gate 24.

A port counter 28 examines the ports in turn via the multiplexors 12,14. Ports are examined in a predetermined sequence, for example port 15 then port 14 and so on until port 0, then port 15 is reexamined. Movement of the port counter from one port to the next is under the control of a decr input 30. The decr input 30 is updated by a port-1 signal on line 32 via an OR gate 34 which determines that the port-1 signal is asserted if one of the following three signals is asserted.

The first of these is the output of the third AND gate 20 on line 36. The second signal is a patience=0 signal on line 38 generated by a patience counter 40 in a manner to be described hereinafter. The third signal is a span=0 signal on line 42 generated by a span counter 44 in a manner to be described herein after. The output of the NOR gate 34 which is used to control the decr input 30 of the port counter 28 is also used to control the set input of an RS flip-flop 46. In the conditions described below, the AND gate 26 generates a grant signal on line 48 which is supplied via a demultiplexor 50 to the port currently being examined. Thus, as can be seen the grant signal on line 48 is generated if the request line 16 is asserted and if either the samep line 22 is asserted or the output of the RS flip-flop 46 is asserted on the first line 52. This indicates that the request is the first request made by the port under examination. The grant signal on line 48 is supplied to the reset input of the RS flip-flop 46 to de-assert the first signal on line 52 after the first memory access has been granted to the port under examination. Thus, if a port's request line is asserted when it is first examined, then the corresponding grant line will be asserted. This gives the port tenure for a single memory access. After the first memory access, the arbitrator will continue to assert the grant line in accordance with the following parameters:

1) It will grant each port a maximum of four consecutive requests before it will examine other ports and give them the opportunity of having their request granted—this is referred to as a span of 4.
2) Within the span, requests have to access addresses which only differ in their lower 11 bits. This is signaled by assertion of the samep signal on line $S_0 \ldots S_{15}$ which is asserted by each port which can compare the memory address of the current request with the memory address which it last requested access to.
3) A subsequent memory access has to be made within six cycles of a previous request in the same span. In the embodiment described herein, this is counted by the patience counter 40.

Thus, the port counter 28 is decremented and the arbitrator starts a new span with a different port in the following conditions:

1) The access span of 4 has been exhausted.
2) More than 6 cycles have passed since the last access in the span.
3) The samep signal is deasserted.

In the circuitry of FIG. 3, this is implemented as follows.

The state of the arbitrator at any time is held by the three counter registers: PORT 28, SPAN 44 and PATIENCE 40. In this implementation they have the values shown in TABLE I.

TABLE 1

| Counter name | Range | Reset value |
| --- | --- | --- |
| PORT | 0 ... 15 | Don't care |
| SPAN | 0 ... 4 | 4 |
| PATIENCE | 0 ... 6 | 6 |

The value in the PORT counter 28 indicates the port which currently has tenure (ie., is granted) or the port which is being examined to determine if it has a request. The port has initial value 15 and decrements to 0 when its decr line 30 is asserted. On being decremented from 0 it wraps around back to the value 15. In this way each port in turn is visited in a cyclical manner.

The value in the SPAN counter 44 indicates the number of further requests that a port may be granted. As each request is granted, the grant signal on line 48 causes the span-1 line 54 to be asserted thus decrementing the SPAN counter 44. When a requester has been granted 4 times the port is decremented and a different requester is given the opportunity to be granted. The SPAN counter is reset by the port-1 signal on line 32.

The PATIENCE counter 40 is essentially a timer which can end a span if requests are not made soon enough after the last request in the same span. On starting a new span the PATIENCE counter has the value 6. The counter is decremented on each cycle that the bus is not busy and there is no request (by the outputs of the second AND gate 18). It is reset each time a grant is made (grant signal on line 48) or the port counter value changes (port-1 signal on line 32).

A grant signal is asserted for the examined port if the port indicated by the current value of port counter asserts a request which is either the first in a span or has its samep signal asserted.

Once a port has received a grant it de-asserts its request on the next cycle. When it has another request to make it can do so at any time after the bus_busy cycle is asserted. The port asserts its samep signal if the address of the current access differs from that of the previous address in only the lower order 11 bits. This is done by a simple compare circuit in the port which is not described further herein.

Figure 4A:
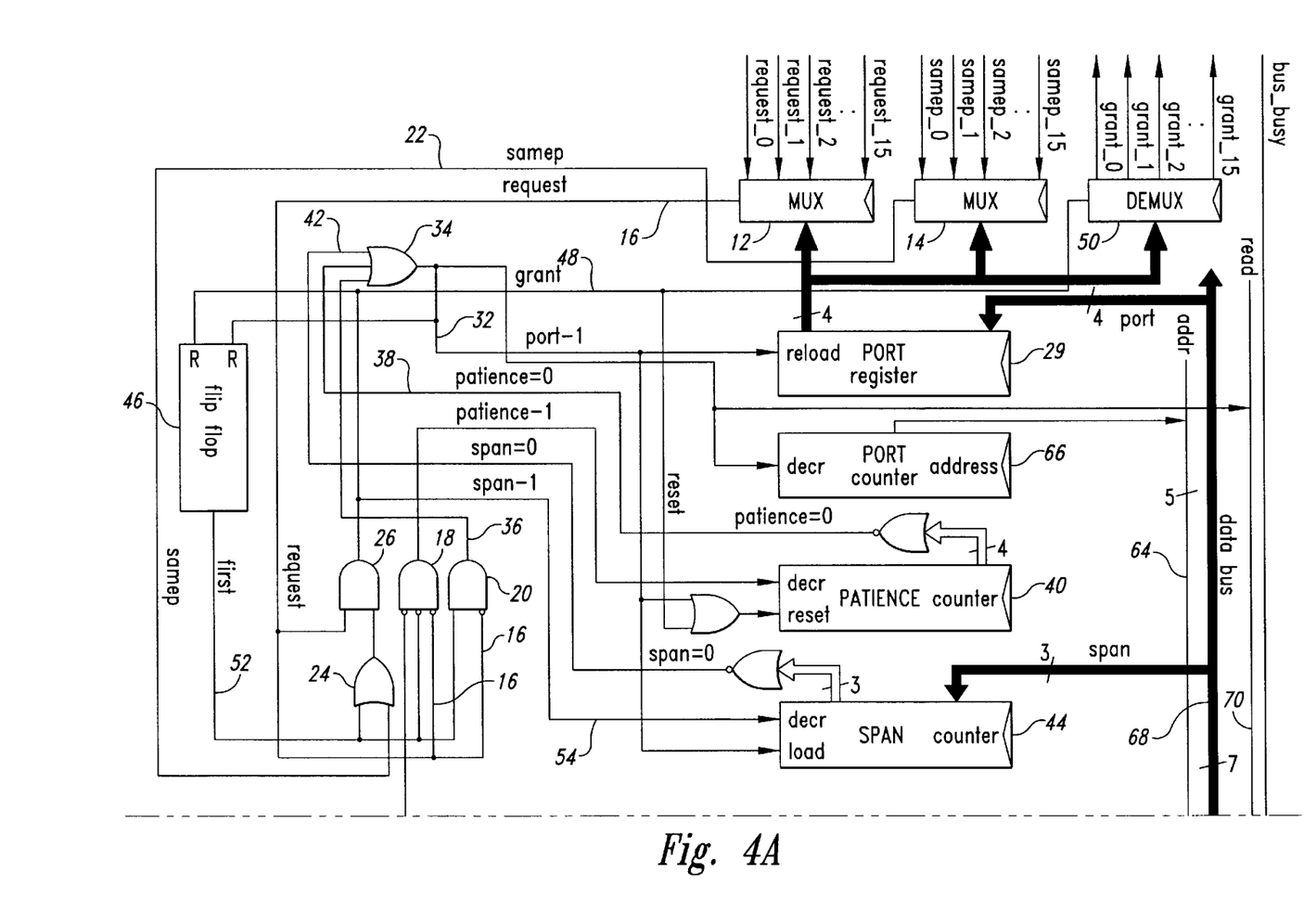
FIG. 4 is a schematic diagram of an implementation of an enhanced arbitrator.
Figure 4B:
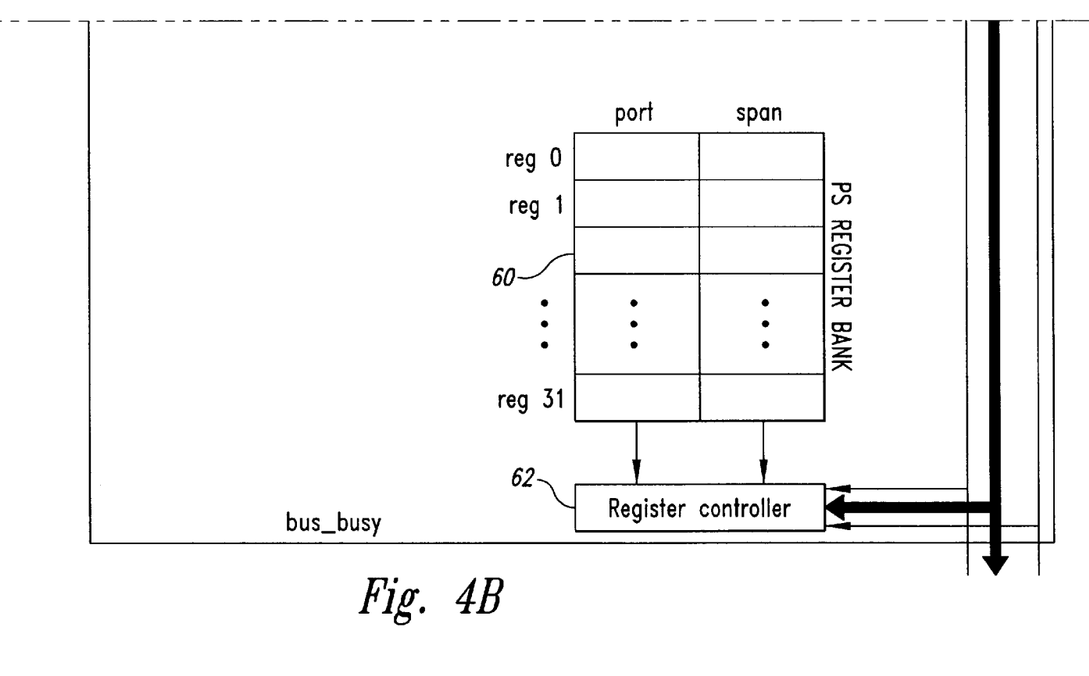

FIG. 4 shows an enhanced version of the arbitrator. With reference to the circuit of FIG. 3 it makes two enhancements:

1) The order in which the ports are traversed is programmable.
2) The span width of each port is programmable.

In FIG. 4 like numerals denote like parts as in FIG. 3.

The programmability is achieved by adding a register bank 60 of 32 registers which contains {port,span} tuples and a port address register. A register controller 62 allows the contents of the registers $Reg_0 \ldots Reg_{31}$ to be accessed responsive to a PORT address supplied on address bus 64. The PORT address is supplied from a PORT address counter 66 which receives the port-1 signal output from the OR gate 34. The contents of each register are supplied along data bus 68 to the PORT register 29 which takes the place of the PORT counter 28 in FIG. 3, as described more fully hereinafter. The port-1 signal is also used to generate a read signal on line 70 to activate the register controller 62. On those occasions where the PORT counter 28 would have been decremented in FIG. 3, in this scheme, the PORT address counter 66 is decremented which causes the PORT register and the SPAN register to fetch new values from the register bank 60 at the position pointed at by the PORT address counter.

This implementation provides two main benefits over the simpler scheme discussed above:

1) Control of the share of bandwidth allocated to each port.
2) Control of maximum memory latency observed by a port By varying the number of times a port appears in the register bank 60 and by varying the size of the spans associated with each register it is possible to control the share of the memory traffic which each port might have in a busy system. This is a key advantage in a real time system. For example all other things being the same, a port appearing twice as often in the register bank 60 (ie., having twice as many slots in a traversal of the register bank) as another port has twice as much bandwidth allocated. In addition, the patience value can be programmable.

The programming also affects the maximum latency observed by a port. The maximum latency observed by a port can be calculated by observing the maximum number of requests granted to other ports which can occur between consecutive visits to the same port. By placing several spans belonging to a port in the register bank 60 it is possible to limit this arbitrarily. For example, if all span widths were of value 4, then by programming every other register to contain a span for some port $P_3$ say, then port $P_3$ is never more than four memory accesses away from being granted.

The above advantages are implemented as described below with reference to FIG. 4.

Ports are examined in turn in the order as determined by the contents of the register 31 then register 30 and so on until register 0 then the contents of PS register 31 are re-examined.

If a port has its request line asserted when it is examined then the corresponding grant line is asserted. This gives the port tenure for a single memory access. The arbitrator grants ports a maximum of n consecutive requests (constituting the span) before it examines other ports and gives them the opportunity of having their requests granted. The value n of a span is determined by the contents of the register for that port.

Within a span, requests have to access addresses which differ only in their lower 11 bits (as indicated by samep) and have to be made within 6 cycles of the previous request in this span.

In other words when the arbitrator examines a port it will grant a request if it is the first request of a span or both of the following conditions are met:

1) The samep signal is asserted.
2) The request is made within 6 cycles of the completion of the last tenure.

If this is not the case the port address counter is decremented and the arbitrator starts a new span.

The state of the arbitrator at any time is held by the four registers constituting the PORT register 29, the PORT address counter 66, the SPAN counter 44 and the PATIENCE counter 40. In this implementation they have the values shown in TABLE II.

TABLE II

| Register name | Range | Reset/Reload value |
|---|---|---|
| PORT register | 15 . . . 0 | Reload from PS register |
| PORT address counter | 31 . . . 0 | Don't care |
| SPAN Counter | 0 . . . 4 | Reload from PS register |
| PATIENCE | 0 . . . 6 | Reset to 6 |

The value of the PORT address counter 66 determines which register in the register bank 60 will next load its contents {port,span} respectively into the PORT register 29 and SPAN counter 44. When the decr signal line of this register is decremented by the port-1 signal the values in the register addressed by the contents of the PORT address counter are loaded into the PORT register and SPAN counter via the data bus 70.

The value in the PORT register 29 indicates the port which currently has tenure (i.e., is granted) or the port which is being examined to determine if it has a request.

The value in the SPAN counter indicates the number of further requests that a port may be granted. This controls generation of the grant signal in a manner described previously.

As before, the PATIENCE counter is essentially a timer which can terminate a span if requests are not made soon enough after the last request in the same span. On starting a new span the PATIENCE counter has the value =b 6. The counter is decremented on each cycle that the bus is not busy and there is no request. It is reset each time a grant is made or the PORT address counter value changes.

The register bank 60 is a set of 7-bit registers which control the order of traversal of the ports and the size of each span. They are in the memory address space and so are read/writable by a processor or other device which may want to program the arbitrator. The mechanism for accessing the register bank by another bus user is standard and not described here.

Figure 5:
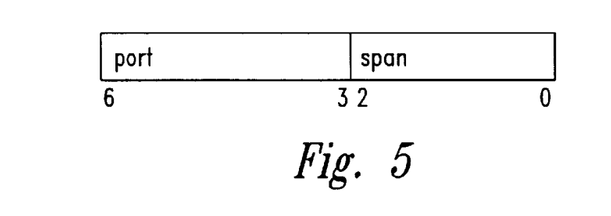
FIG. 5 illustrates a programmable register within the arbitrator.

Each register has two fields: a 3-bit span field comprising bits 0 . . . 2 of each register and a 4-bit port field comprising bits 3 . . . 6 of each register. This is shown in FIG. 5.

When the read line 70 is asserted by the arbitrator the register controller 62 accesses the register indicated by the contents of the Addr lines 64 and places the 7-bit contents onto the data bus 68, where the appropriate bits are latched into the PORT register 29 and SPAN counter 44.

The grant signal is asserted if the port indicated by the current value of port counter is asserting a request which is either the first in a span or has its samep signal asserted.

Once a port receives a grant it de-asserts its request on the next cycle. When it has another request to make it can do so at any time after the bus busy cycle is asserted. The port asserts its samep signal if the address of the current access differs from that of the previous address in only the lower order 11 bits.

Figure 6:
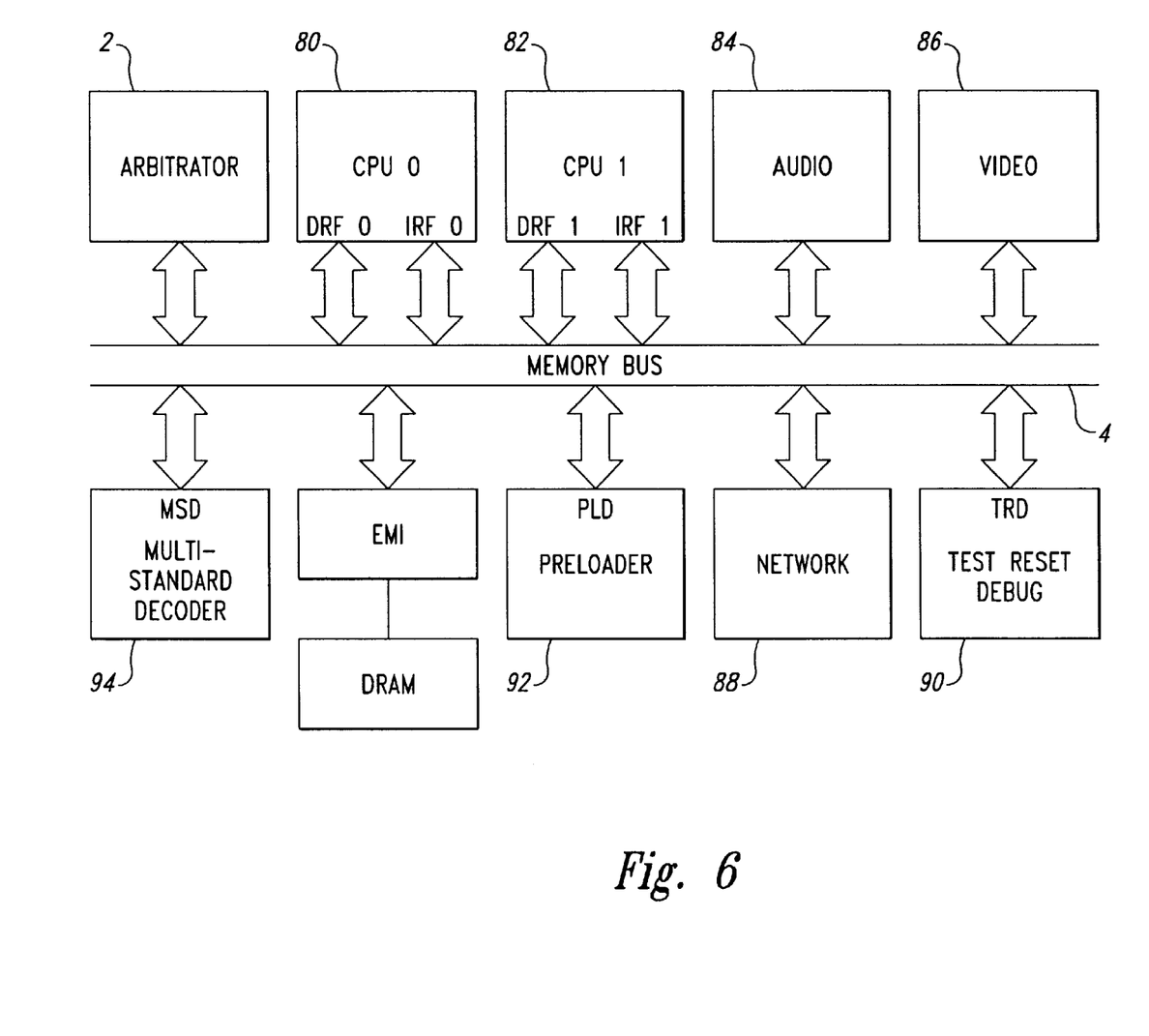
FIG. 6 is a block diagram of one exemplary system architecture.

It will be appreciated that when the arbitration system is implemented in a computer system having a plurality of independent modules connected to the bus, a module may have more than one port. For example, in the illustrated programmed example which follows, a possible architecture is shown in FIG. 6. Like numerals denote like parts as in preceding figures. Thus, the following components are connected to the memory bus 4:

a first processor 80 (CPU0) having a data port DRF0 and an instruction port IRF0;

a second processor 82 (CPU1) having a data port DRF1 and an instruction port IRF1;

an audio interface 84;

a video interface 86;

a network interface 88;

a test reset debug module 90 having a port TRD;

a preloader 92 having a port PLD; and a multistandard decoder 94 having a port MSD.

The ports of the above-referenced modules are each allocated a port 5 number. One allocation example is given in TABLE III.

TABLE III

| Module and port name | Port number | Binary port number |
|---|---|---|
| Instruction port of CPU0 | 1 | 0001 |
| Data port of CPU0 | 2 | 0010 |
| Instruction port of CPU1 | 3 | 0011 |
| Data port of CPU1 | 4 | 0100 |
| Audio interface | 5 | 0101 |
| Video interface | 6 | 0110 |
| Network Interface | 7 | 0111 |
| Test Rest Debug module | 9 | 1001 |
| Multi Standard Decoder | 10 | 1010 |
| Preloader | 11 | 1011 |

TABLE IV represents an example of how the register bank 60 may be programmed to control memory accesses by the various modules connected to the bus 4.

TABLE IV

| Register Address | Portsnumber bits (7:4) | maximum samepage requests bits (3:1) | last span? Bit (0) |
|---|---|---|---|
| 8 | MSD | 4 | 0 |
| 9 | PLD | 8 | 0 |
| 10 | IRF1 | 4 | 0 |
| 11 | IRF0 | 4 | 0 |
| 12 | Video | 8 | 0 |
| 13 | DRF0 | 4 | 0 |
| 14 | DRF1 | 4 | 0 |
| 15 | Video | 8 | 0 |
| 16 | IRF0 | 4 | 0 |
| 17 | IRF1 | 4 | 0 |
| 18 | Audio | 4 | 0 |
| 19 | Network | 4 | 0 |
| 20 | TRD | 4 | 1 |
| 21 | spare | | |
| 22 | spare | | |
| 23 | spare | | |

Figure 7:
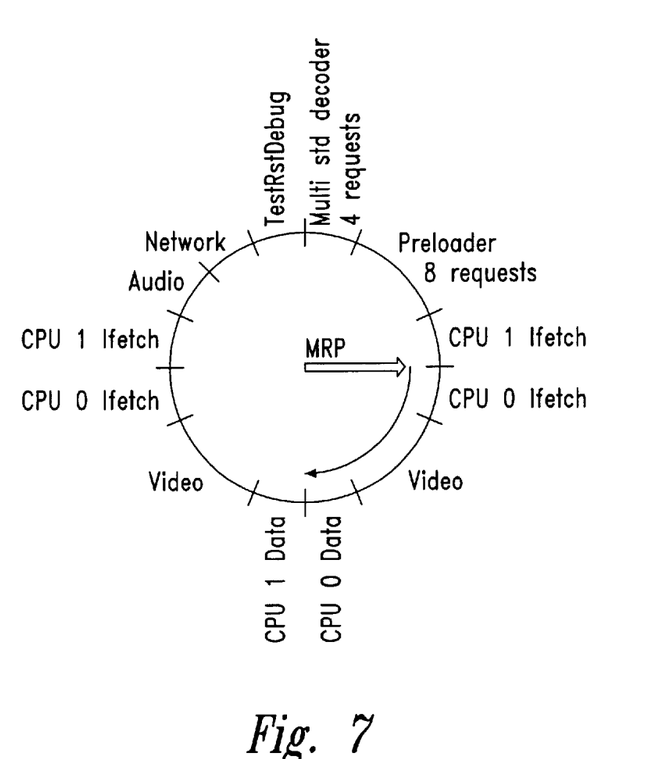
FIG. 7 is a schematic visualization of operation of the present invention.

The effect of a programmed arbitration system can be visualized as in the diagram of FIG. 7. The arbitration circuitry described above can be considered to have a memory resource pointer MRP which is used as an index for the register bank 60 to determine which port is currently able to request the memory resource. As described above, when a port has made all its allocated samepage request or makes a request on a new page or "times out", the MR pointer moves onto the next port. If this port is not requesting the memory resource, the pointer will move on again. Moving on past inactive points may not be instantaneous, but it is not difficult to ensure that any delay caused can usually be hidden by the time taken for the EMI to satisfy the current request. As illustrated in FIG. 7, this can be visualized in the form of a wheel around which the memory resource pointer MRP rotates dealing with requests from each port in turn.

The time taken for the memory resource pointer MRP to cycle round and return to the same value is called the MR period.

The worst case MR period occurs when each port in the table makes the maximum number of allocated samepage requests.

At first inspection the worst case MR period would appear to be the total number of requests in the MR table multiplied by the time for a 4-word read request. However, in practice, different ports have different patterns of memory access. For example the audio port 84 always uses single word reads whereas the Instruction fetch port (IRF0,IRF1) of the CPUs uses four-word reads.

The size of each of these requests is not known to the arbitrator but the actual time taken to service the requests will depend on the size of the request so this should be taken into account when programming the MR parameters.

Thus, when deciding the number of samepage requests to allocate to each port, operation of the system is improved if the pattern of memory requests from that port is considered.

Consider a port that repeats the following pattern:
four requests on one page,
four requests on another,
a single request on a third page.

If such a port were to be given a span of four requests, it will use three spans to complete the above pattern. In the third span, the first request is granted but the next request is on a different page so the memory resource pointer MRP moves on. When the pointer returns to this port it will grant the next four requests together as they are all on the same page. In contrast, if groups of three requests have been allocated, five spans would have been required to complete the pattern.

The arbitration systems described above are able to achieve higher levels of memory performance from standard DRAM memory components than existing arbitration schemes.

Note that it is possible to combine the above-described arbitration scheme which controls accesses to memory with a standard method for requests to other (non-DRAM) ports. This is however not described further herein, although it is noted that when memory requests and non-memory requests co-exist on the bus, the arbitrator is able to identify and treat them differently.

APPENDIX A

| Symbol | Operation |
|---|---|
|  | Clocked multiplexor. The value select is used to specify one input line. The value on this input is latched and copied to the output line. |
|  | Clocked Demultiplexor. The value select is used to specify one output line. The value of the input line is latched and copied to the specified output. |

APPENDIX A-continued

| Symbol | Operation |
| --- | --- |
|  | n-input OR Gate.<br>The output is the logical or of the inputs. Note that signals input to or output from this gate may be optionally inverted as indicated by the presence of a circle at the point the input or output lines intersect with the gate. |
|  | n-input AND gate.<br>The output is the logical and of the inputs. Note that signals input to or output from this gate may be optionally inverted as indicated by the presence of a circle at the point the input or output lines intersect with the gate. |
|  | Clocked counter register.<br>When the reset line is asserted the counter reverts to a predefined value. This value is dependent on the particular instance of the register and is the maximum value that the counter can hold. When the decr line is asserted the value in the register is decremented by 1. If the value in the register is zero before being decremented and the decremented value becomes the maximum value that the counter can hold. At all times the value of the counter is asserted on the Data lines. |
|  | Flip-Flop.<br>The flip-flop holds a single bit value which is asserted on the data line. Asserting the set line at any time causes the data line to be held at '1' indefinitely. The data line may be reset to '0' by asserting the reset line where it is held until the next assert on the set line. |
|  | Clocked Reloadable register.<br>The value on the dataout lines is always the contents of the register. When the reload line is asserted the counter latches the value on the detain lines into its register. |

What is claimed is:

1. A bus arbitration system comprising:

a memory bus having an interface for accessing memory wherein items are held at locations in memory organized in address sets such that when one location in an address set has been accessed, remaining locations in the same address set can be accessed more quickly by a subsequent memory access than other locations in the memory;

a plurality of memory users each having access to the memory bus and each operable to generate a request for access to the memory;

wherein each memory user has comparator circuitry having a first address store for storing the address of a current memory access request and a second address store for storing the address of the last memory access request, said comparator circuitry being operable to generate a same-address-set signal when the address of the last access by that memory user lies in the same set as the address of the current access; and an arbitrator configured to control access to the memory bus by the memory users in response to the requests, wherein each memory user is operable to read the address of a current access to memory and to generate a same-address-set signal when the address of the last access by that memory user lies in the same set as the address of the current access, and wherein the arbitrator holds for each memory user a predetermined number of consecutive accesses which are permitted by that memory user during an access span and, responsive to a request, grants up to that predetermined number of consecutive accesses provided that the same-address-set signal is asserted.

2. The bus arbitration system according to claim 1 wherein the locations are addressable by memory addresses comprising a number of addressing bits such that locations within an address set are addressable by a reduced number of addressing bits.

3. The bus arbitration system according to claim 2 wherein each address set constitutes a page in memory.

4. The bus arbitration system according to claim 2 wherein a memory address comprises a row address and a column address and the locations within each address set have the same row address.

5. The bus arbitration system according to claim 1 wherein the arbitrator has sequence determining circuitry for determining a sequence in which memory users are examined by the arbitrator to see whether or not they are generating a request.

6. The bus arbitration system according to claim 5 wherein the sequence determining circuitry is programmable in accordance with the number and type of memory users having access to the memory bus.

7. The bus arbitration system according to claim 1 wherein the arbitrator comprises timing circuitry for determining a maximum time allowed between consecutive requests in an access span.

8. The bus arbitration system according to claim 1 wherein the predetermined number of accesses which are permitted by each memory user is programmable in accordance with the pattern of memory accesses to be effected by that memory user.

9. A method of controlling accesses by multiple memory users to a common memory wherein items are held at locations in memory organized in address sets such that when one location in an address set has been accessed, remaining locations in the same address set can be accessed more quickly by a subsequent memory access than other locations in the memory, comprising:

each memory user reading the address of a current access to memory, comparing said address of a current memory access with the address of the last memory access and generating with a request for access to the memory a same-address-set signal when the address of the last access by that memory user lies in the same set as the address of the current access; and granting a predetermined number of consecutive memory accesses to each memory user during an access span provided that the same-address-set signal is asserted.

10. The method according to claim 9 wherein the locations are addressable by memory addresses comprising a number of addressing bits, such that locations within an address set are addressable by a reduced number of addressing bits.

11. The method according to claim 10 wherein each memory address comprises a row address and a column address and the locations within an address set are addressable by a common row address.

12. The method according to claim 9 wherein the memory users are examined according to a predetermined sequence to determine whether they are generating a request for access to the memory.

13. The method according to claim 12 wherein the predetermined sequence is programmable in accordance with the number of memory users whose accesses are to be controlled.

14. The method according to claim 9 wherein a predetermined maximum time period is allowed between consecutive requests in an access span.

15. The method according to claim 9 wherein the predetermined number of accesses allotted to each memory user is programmable in accordance with the pattern of memory accesses by that memory user.

16. A bus arbitration system for controlling access to a memory device by a plurality of memory users, each memory user having at least one request line, the system comprising:

a comparator circuit for each memory user, each comparator circuit configured to compare successive memory address requests to prior memory address requests and to generate a memory user priority signal when successive memory addresses are within a predetermined memory address locality; and an arbitrator having a first counter responsive to the memory user priority signal to control examination of memory user request lines, and a second counter to control the number of consecutive memory access requests the arbitrator will handle from each memory user during examination of each memory user's request lines.

17. The system of claim 16 wherein memory addresses comprise a number of addressing bits such that locations within the predetermined memory address locality are addressable by a reduced number of addressing bits.

18. The system of claim 16 wherein memory addresses comprise a row address and a column address, and the location within each predetermined memory address locality have the same row address.

19. The system of claim 16 wherein the arbitrator has sequence determining circuitry for determining the sequence of examination.

20. The system of claim 19 wherein the sequence determining circuitry is programmable in accordance with the number and type of memory users having access to the memory device.

21. The system of claim 16, further comprising a timer to control the length of time the first counter will wait from the last memory access request until cycling examination to the next memory user request line.

22. The system of claim 16 wherein the second counter is programmable in accordance with the pattern of memory accesses to be effected by that memory user.

* * * * *